(12) United States Patent
Wang et al.

(10) Patent No.: US 6,264,811 B1
(45) Date of Patent: Jul. 24, 2001

(54) ION CONDUCTING CERAMIC MEMBRANE AND SURFACE TREATMENT

(75) Inventors: Weitung Wang, East Amherst; Jack C. Chen, Getzville; Prasad Apte, East Amherst, all of NY (US); Terry Joseph Mazanec, Naperville, IL (US)

(73) Assignees: Praxair Technology, Inc.; BP Amoco Corporation, both of Danbury, CT (US)

(*) Notice: Subject to any disclaimer, the term of this patent is extended or adjusted under 35 U.S.C. 154(b) by 0 days.

(21) Appl. No.: 09/532,123

(22) Filed: Mar. 21, 2000

(51) Int. Cl.$^7$ .................................................. C25B 13/00
(52) U.S. Cl. .............................. 204/295; 205/634; 95/45; 95/54
(58) Field of Search ...................................... 204/295, 421; 205/687, 634; 95/54, 45; 96/4; 429/30, 33

(56) References Cited

U.S. PATENT DOCUMENTS

| | | | |
|---|---|---|---|
| 4,234,310 | 11/1980 | Leuthard | 433/228 |
| 4,791,079 | 12/1988 | Hazbun | 502/4 |
| 5,240,480 | 8/1993 | Thorogood et al. | 96/4 |
| 5,648,304 | * 7/1997 | Mazanec et al. | 96/4 |
| 5,693,212 | * 12/1997 | Mazanec et al. | 204/295 |
| 5,702,999 | * 12/1997 | Mazanec et al. | 95/54 |
| 5,709,732 | 1/1998 | Prasad | 95/45 |
| 5,723,035 | 3/1998 | Mazanec et al. | 204/295 |
| 5,733,435 | 3/1998 | Prasad et al. | 205/765 |
| 5,788,748 | * 8/1998 | Mazanec et al. | 96/4 |
| 5,837,034 | 11/1998 | Keskar et al. | 95/54 |
| 5,888,272 | 3/1999 | Prasad et al. | 95/54 |
| 5,938,822 | 8/1999 | Chen et al. | 96/11 |
| 6,090,500 | * 7/2000 | Ishihara et al. | 204/295 |

OTHER PUBLICATIONS

Teraoka et al., "Development of Oxygen Semipermeable Membrane using Mixed Conductive Perovskite–Type Oxides (Part 2)", J. Ceram. Soc. Jpn. Inter. Ed., vol. 97 (1989) pp. 523–529.

* cited by examiner

*Primary Examiner*—Bruce F. Bell
(74) *Attorney, Agent, or Firm*—David M. Rosenblum

(57) ABSTRACT

The present invention provides an ion conducting ceramic membrane selectively permeable to a gas, for instance oxygen and a method of treating such a membrane to improve permeation through the membrane. The membrane is formed by a mass of a substance through which ions of the gas migrate. The mass has two opposed surfaces where dissociation and ionization of the gas occurs and gas ions release electrons and recombine to form molecules of the gas, respectively. At least one of said two opposed surfaces is treated by a removal of surface material to produce surface irregularities of increased area and therefore an increase in total surface area of a treated surface to in turn increase permeation of the gas. Preferably, both surfaces of the membrane are treated by chemical etching techniques, although sand blasting and ion etching are other possible surface treatments in accordance with the present invention.

13 Claims, 2 Drawing Sheets

ION CONDUCTING CERAMIC MEMBRANE AND SURFACE TREATMENT

FIELD OF THE INVENTION

The present invention relates to an ion conducting ceramic membrane and method of surface treatment in which one or both of opposed surfaces of the membrane is treated to enhance the rate of permeation through the membrane. Even more particularly, the present invention relates to such a membrane and method in which the surface(s) is treated to increase surface irregularity and therefore, surface area.

BACKGROUND OF THE INVENTION

Various gases, for example, oxygen, can be separated from air or other feed streams by systems of ion conducting, ceramic membranes. Such ceramic membranes exhibit ion conductivity at temperatures well above 500° C., generally in a range of between about 600° C. and about 1100° C. A central issue surrounding the use of such membranes is that the transport rate of the gas through the membrane must take place at a sufficient rate to make the separation economically attractive.

For instance, ceramic membrane materials useful in separating oxygen, in general, are mixed conductors, which possess both oxygen ion conduction and electronic conduction in either single-phase or dual-phase states. The driving force of the overall oxygen transport rate for the membrane is the different oxygen partial pressure applied across the membrane. Since the membrane is dense and gas tight, the direct passage of oxygen molecules is blocked. Oxygen ions, however, can migrate selectively through the membrane. Dissociation and ionization of oxygen occurs at the membrane cathode surface where electrons are picked up from near surface electronic states. The flux of oxygen ions is charge compensated by a simultaneous flux of electronic charge carriers. When the oxygen ions arrive at the opposite anode surface of the membrane, the individual ions release their electrons and recombine again to form oxygen molecules, which are released in the permeate stream.

The permeation rate through a non-porous ceramic membrane is controlled by two major factors: (1) the solid-state ionic transport rate within the membrane and (2) the ion surface exchange rate on either side of the membrane. The flux of the gas to be separated usually can be increased by reducing the thickness of the membrane, until its thickness reaches a critical value. At above the critical value, the flux is controlled by both the ion surface exchange kinetics and solid state ionic transport rate. Below the critical thickness, the oxygen flux is mainly dominated by its ion surface exchange rate. Therefore, thinner membranes are desirable due to their higher solid state ionic transport rate than are thicker membranes. However, a lower ion surface exchange rate (i.e. a higher surface resistance to transport rate) of thinner membranes, becomes more dominating in the overall component transport rate. Surface resistances arise from various mechanisms involved in converting the molecules to be separated into ions or vice-versa at both surfaces of the membrane.

The prior art is replete with references and disclosures that involve the enhancement of the ion surface exchange rate by adding layers containing either porous dual phase mixed conductor coating or porous single phase mixed conductor coating onto a dense ceramic membrane material to enhance its flux.

For instance, in Y. Teraoka et al., "J. Ceram. Soc. Jpn. Inter. Ed.", Vol. 97, Nos. 4 and 5, pp. 523–529 (1989), discloses a gas separation membrane formed by depositing a dense mixed conducting oxide layer onto a porous mixed conducting support. In an example in which a suspension spray deposition technique was used to deposit the mixed conducting oxide layer, the resultant thin film element exhibited a two fold increase in oxygen permeation over a dense sintered sample without the deposited layer. Similarly, U.S. Pat. No. 5,240,480 discloses multi-layer composite solid state membranes exhibiting a superior oxygen flux that comprises a multicomponent metallic oxide porous layer and a dense layer.

U.S. Pat. No. 4,791,079 teaches an increased kinetic rate of the permeate side interfacial gas exchange through the use of a catalytic ceramic membrane consisting of two layers. The layers are an impervious mixed ion and electronic conducting ceramic layer and a porous catalyst-containing ion conducting ceramic layer. U.S. Pat. No. 5,723,035 illustrates the use of a porous coating of metal, metal oxide or combinations thereof to increase the kinetic rate of the feed side interfacial fluid exchange, the kinetic rate of the permeate side interfacial exchange, or both.

U.S. Pat. No. 5,938,822, discloses a membrane composed of a dense dual phase electronic-mixed conducting membrane and a porous dual phase electronic-mixed conductor or a porous single phase mixed conductor coating. The porous coating is disposed on at least one of the two opposed surfaces of the membrane to enhance the rate of surface reactions involving the gaseous species. This surface modification on the air side enhances ion surface exchange kinetics by increasing the surface area for oxygen dissociation.

It is apparent from the above discussion that all of the prior art membranes involve the fabrication of multi-layer membranes to improve ion surface exchange kinetics and therefore the oxygen permeation rate through the membrane. As will be discussed, the present invention employs a surface treatment to enhance membrane ion surface exchange kinetics that is less complicated in its execution than prior art techniques because it does not depend on the application of additional membrane layers.

SUMMARY OF THE INVENTION

The present invention provides an ion conducting ceramic membrane selectively permeable to a selected gas. In accordance with the invention, the ceramic membrane has a mass of a substance forming the ceramic membrane and through which gas ions migrate. The mass has two opposed surfaces where dissociation and ionization of the gas occurs and the gas ions release electrons and recombine to form molecules of the gas, respectively. At least one of the two opposed surfaces is treated to enhance permeation of the gas through the ceramic membrane by a removal of surface material to produce surface irregularities of increased area and therefore an increase in total surface area of a treated surface. In this regard, the term "surface irregularities" as used herein and in the claims means any measurable irregularity in a surface that deviates from a smooth regular surface. For instance, the surfaces of ceramics when examined under the type of magnification that can be provided by an electron microscope exhibit sub-microscopic ridges and voids. The treatment of the present invention adds irregularities and/or adds irregularities of increased depth and/or increases the depth of irregularities present before the treatment so that the surface irregularities provide an increased surface area. It is an increase in surface area that translates into an increase in the total surface area of the membrane. In this regard, the term, "total surface area" as used herein and in the claims means the area of a surface including the additional areas, beyond the geometric surface frontal area alone, contributed by the ridges and voids of the surface irregularities.

It is to be noted that since the present invention is a surface treatment involving the removal of surface material, it does not contemplate the removal of material to an extent that the irregularities would communicate continuously between the two opposed surfaces. A further point is that not every area on the surface of the treated membrane is necessarily used for transport. Some areas created by a treatment in accordance with the present invention are so tortuous or of such small scale that gas surface interactions are in fact impeded. However, the effect of such areas on oxygen transport rate is minor.

Advantageously, both of the two opposed surfaces can be treated. The thickness of a membrane, treated in accordance with the present invention, as measured between the two opposed surfaces, is preferably no greater than about 1.0 mm. and more preferably no greater than about 0.5 mm. This thickness when coupled with the treatment of the present invention maximizes oxygen permeation by both increasing the solid state ionic transport rate and the ion surface exchange rates.

Although the present invention is not limited to oxygen selective membranes, the selected gas can be oxygen. Additionally, the substance forming the membrane can be a perovskite having the general formula $[A_{1-x}A'_x][Co_{1-y-z}B_yB'_z]O_{3-d}$, wherein A is a group II metals, Ca, Sr, Ba, or a mixture thereof; A' is a rare earth metal and lanthanides or actinides, La, Y, Ce, Pr, Nd, Pm, Sm, Eu, Gd, Td, Dy, Ho, Er, Tm, or U or a mixture thereof; B is Mn, Cr, V, Ti, or a mixture thereof; B' is Cu or Ni or a mixture thereof; x is from 0.00001 to 0.9; y is from 0.001 to 0.9; z is from 0 to 0.8; and d is determined by the valence of the other metals and wherein the cubic perovskite phase is substantially stable over the temperature range of about 25° C. and about 1000° C. in air.

In another aspect the present invention provides a method of treating an ion conducting ceramic membrane selectively permeable to a selected gas to increase permeation of the gas. The ceramic membrane is provided with two opposed surfaces where dissociation and ionization of the gas occurs and gas ions release electrons and recombine to form molecules of the gas. The method comprises removing surface material from at least one of two opposed surfaces of the ceramic membrane to produce surface irregularities of increased area and therefore an increase in total surface area of a treated surface.

Advantageously, the surface material can be removed by chemical etching, sand blasting, or ion bombardment. In case of chemical etching the surface material is removed by exposing one or more of the two surfaces to an aqueous solution of $HNO_3$ having a concentration in a range of between about 10 mole percent and about 50 mole percent for a time period of between about 15 minutes and about twenty four hours, then annealing the surface(s) in air at between about 600° C. and about 900° C. for between about 10 and about 30 minutes. Advantageously, both of the two surfaces are treated.

Without being held to a specific theory of operation, it is believed that by removing surface material and increasing the surface area, more reaction sites for the selected gas are produced and thus a higher flux is possible. Since, in the present invention, material is removed rather than applied by coating, the present invention can be effectuated without formulating and applying another layer as in the prior art. Hence, the present invention provides an enhancement to permeation that is far less complex if not less expensive than surface treatments of the prior art. Other advantages of the present invention will become apparent in the following discussion.

BRIEF DESCRIPTION OF THE DRAWINGS

While the specification concludes with claims distinctly pointing out the subject matter of applicants' invention, it is believed that the invention will be understood when taken in connection with the accompanying drawings in which:

DETAILED DESCRIPTION

Figure 1:
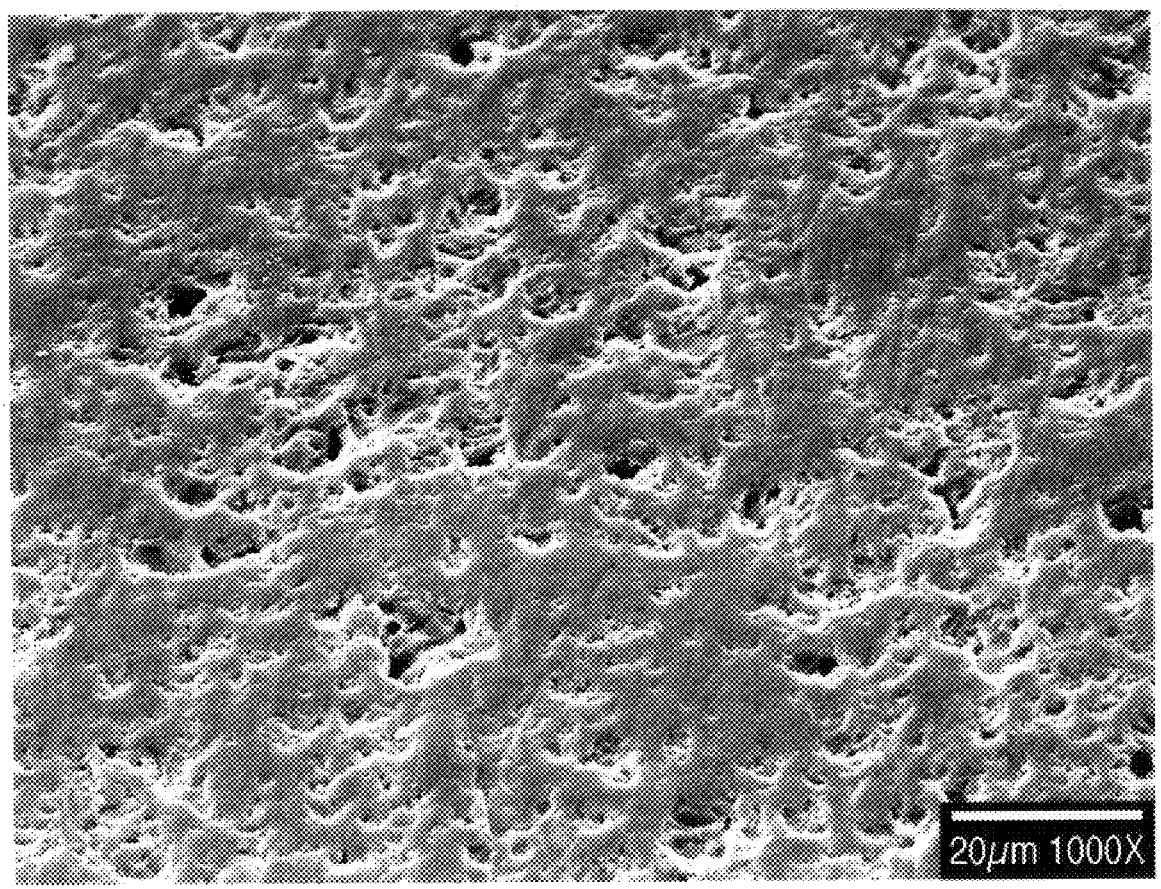
FIG. 1 is a photograph of an image produced by an electron microscope of a surface of a ceramic membrane that has not been treated in accordance with the present invention.
Figure 2:
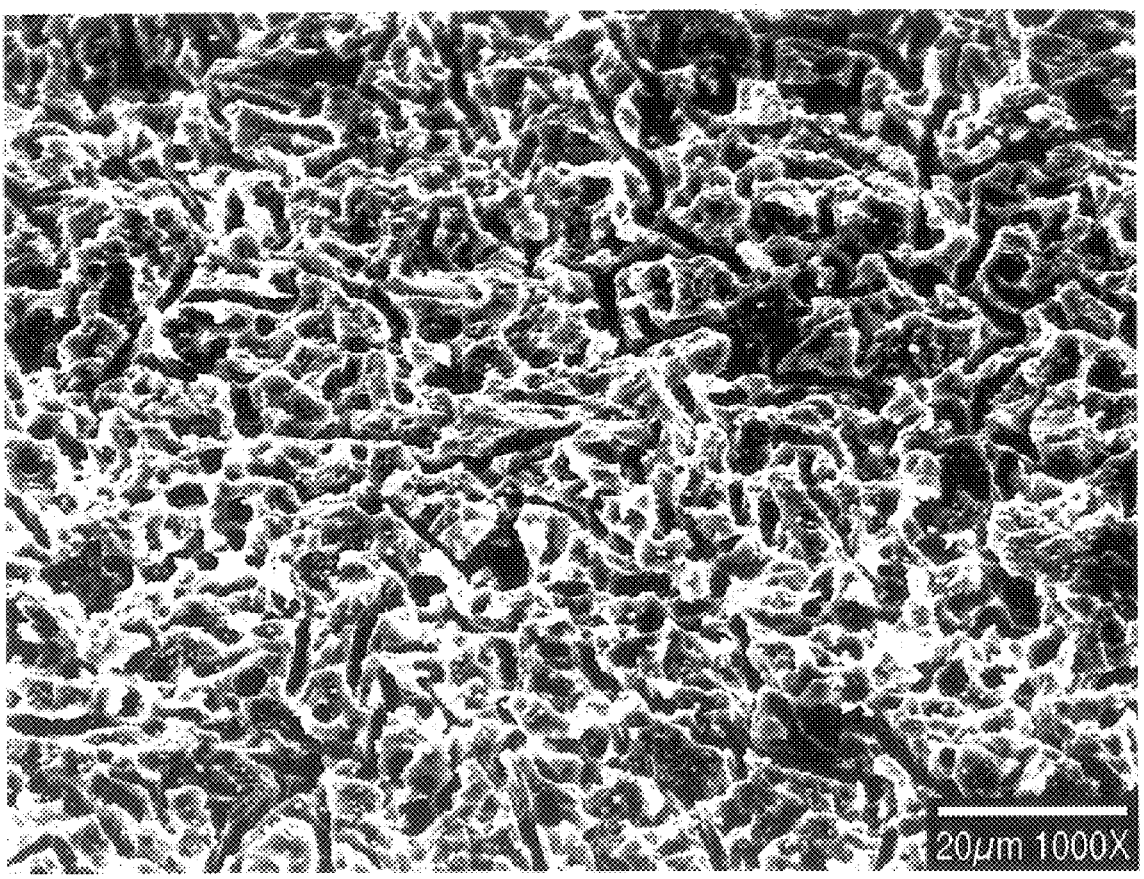
FIG. 2 is a photograph of an image produced by an electron microscope of a surface of a ceramic membrane that has been treated in accordance with the present invention.

FIGS. 1 and 2 show untreated and treated surfaces, respectively. With reference to FIG. 1, the black areas are surface voids, the white linear regions surrounding the voids are ridges, and the gray regions are relatively smooth featureless areas. In FIG. 1, the untreated surface can be seen to be mostly made up of the smooth featureless regions with some voids defined between ridges. The treated surface of FIG. 2 has been eroded by the treatment and has a far more irregular surface with many more voids and ridges than the untreated surface. Furthermore, the voids of FIG. 2 are deeper than those of FIG. 1. Due to such greater and deeper surface irregularity, the treated surface presents a greater total surface area than that of the untreated surface. As stated above, this greater total surface area provides a higher ion surface exchange rate and therefore the potential for a greater rate of permeation than an untreated membrane.

The surface shown in FIG. 2 was treated by chemical etching. Chemical etching can be achieved by immersing the membrane into the dilute acid, for instance, $HNO_3$, HCL, $H_2SO_4$, and etc. For instance, the membrane can preferably be immersed in an aqueous solution of $HNO_3$ having a concentration of between about 10 mole percent and about 50 mole percent for a time period in a range of between about 10 minutes and about 24 hours depending upon the substance making up the particular membrane to be treated. After etching, the membrane is cleaned with solvents, such as ethanol and annealed in air at a temperature of between about 600° C. and about 900° C. for a time period of between about 10 minutes and about 30 minutes to remove residual acid.

Specifically, FIGS. 1 and 2, show coupons formed of $La_{0.2}Sr_{0.8}Cr_{0.2}Fe_{0.8}Mg_{0.01}O_3$ ("LSCFM"). The coupon shown in FIG. 2 was etched by exposure to a $HNO_3$ solution (30 mole percent concentration) for about 24 hours. After the coupon was cleaned with ethanol, the coupon was annealed in air at a temperature of about 900° C. and for a time period of about 30 minutes. It is believed that the etching effect on LSCFM was mostly due to Fe and Cr elements dissolving into the acid solution. EDS data on both surfaces of the disc showed very similar LSCFM element composition. This being said, LSCFM can be over-etched (with a SrO-rich surface) to change element composition if etching is allowed to continue for extended times and/or under strong acid solutions.

It is to be noted that a surface treatment using chemical etching can also help to remove inclusions or unwanted second phases introduced during the manufacturing of the membrane. This is important, particularly for tubular forms of a membrane which usually contain some inclusions on tube surfaces due to the extrusion process used in tube formation. Furthermore, organic solvents, binders, plasticizers, lubricants and other forming agents used in making green shapes and inorganic impurities such as sodium, silicon, sulfur, and etc. can be found on either of the surfaces of the membrane or at grain boundaries after sintering. Such impurities strongly impede oxygen transport rate though the membrane and the surface treatment of the subject invention will help to remove such impurities to improve membrane performance. A further advantage of a treatment in accordance with the present invention is that the increased roughness of the surfaces provides a better surface for attachment of post-coatings, catalysts or catalytically active components.

In addition to chemical etching, several other potential surface treatments can also be used such as sand blasting and ion bombardment. Sand blasting involves eroding the surface(s) of the membrane to be treated with small particles of sand ($SiO_2$). Ion bombardment involves exposing the surface to be treated with accelerated ions of an ionized inert gas, such as Argon, within a vacuum chamber. It is to be noted that sand blasting and ion bombardment processes can treat the exterior surfaces of membranes only. Chemical etching can also treat interior surfaces of membranes of, for instance, a tubular form of the membrane.

Either side of the membrane can be treated to produce a greater total surface area than an untreated surface, but it is preferred that at least the low pressure side be treated to obtain the improvement in permeation contemplated by the present invention. Further known treatments such as annealing, passivation with air or a reducing gas, impregnation with catalytically active metals or metal oxides can be effectuated after a treatment in accordance with the present invention. Furthermore, there is no specific form of a membrane to be treated in accordance with the present invention. For instance, a membrane may be of either planar or tubular form.

As stated previously, thin membranes are desirable due to their high solid state ionic transport rate. However, as membrane thickness decreases, the lower ion surface exchange rate dominates. Since a treatment in accordance with the present invention raises the ion surface exchange rate, the higher solid state ionic transport rate of thinner membranes can be captured. In this regard, a characteristic membrane thickness can be measured or estimated from known measurements. When the membrane thickness is much greater than the characteristic membrane thickness, solid state ionic transport rate effects dominate. On the other hand, when the membrane thickness is much lower than the characteristic membrane thickness ion surface exchange dominates. The characteristic membrane thickness will lie in a range of between about 0.1 mm and about 1.0 mm. Therefore, a membrane treated in accordance with the present invention should preferably have a thickness of not greater than about 1.0 mm and more preferably not greater than about 0.5 mm to take advantage of both higher solid state ionic transport rate and ion surface exchange rates. It is to be noted, however, that the application of the present invention is not limited to thin membranes in that an advantageous increase in permeability is possible even in thicker membranes.

All ceramic membranes can be improved by a process in accordance with the present invention but a preferred material can be selected from a group of materials known as perovskites having the general formula: $[A_{1-x}A'_x][Co_{1-y-z}B_yB'_z]O_{3-d}$, where A is chosen from among the group II metals, Ca, Sr, Ba, or some mixture thereof; A' is chosen from among the rare earth metals and lanthanides or actinides, La, Y, Ce, Pr, Nd, Pm, Sm, Eu, Gd, Td, Dy, Ho, Er, Tm, or U or some mixture thereof; B is chosen from among Fe, Mn, Cr, V, Ti, or some mixture thereof; B' is chosen from among Cu or Ni or some mixture thereof; x is from 0.00001 to 0.9; y is from 0.001 to 0.9; z is from 0 to 0.8; and d is determined by the valence of the other metals, wherein the cubic perovskite phase is substantially stable over the temperature range from between about 25° C. and about 1000° C. in air.

Other examples of ceramic membranes that can be treated in accordance with the present invention are listed in Table I below. It is to be noted, however, that the application of the present invention is not limited solely to such material compositions and in theory, any selective, ion conducting ceramic membrane can be improved thereby. For instance, dense matrix materials other than those comprised only of mixed conductors are also contemplated by the present invention.

TABLE I

Mixed Conducting Solid Electrolytes

Material Composition

1. $(La_{1-x}Sr_x)(Co_{1-y}Fe_y)O_{3-\delta}$ ($0 \leq x = 1$, $0 \leq y \leq 1$, $\delta$ from stoichiometry)
2. $SrMnO_{3-\delta}$ ($\delta$ from stoichiometry)
   $SrMn_{1-y}Co_yO_{3-\delta}$ ($0 \leq y \leq 1$, $\delta$ from stoichiometry)
   $Sr_{1-x}Na_xMnO_{3-\delta}$ ($0 \leq x \leq 1$, $\delta$ from stoichiometry)
3. $BaFe_{0.5}Co_{0.5}YO_3$
   $SrCeO_3$
   $YBa_2Cu_3O_{7-\delta}$ ($0 \leq \delta \leq 1$, $\delta$ from stoichiometry)
4. $La_{0.2}Ba_{0.8}Co_{0.8}Fe_{0.2}O_{2.6}$; $Pr_{0.2}Ba_{0.8}Co_{0.8}Fe_{0.2}O_{2.6}$
5. $A_xA'_{x'}A''_{x''}B_yB'_{y'}B''_{y''}O_{3-\delta}$ (x, x', x'', y, y', y'' all in 0–1 range)
   Where: A, A', A'' = from groups 1, 2, 3 and f-block lanthanides
   B, B', B'' = from d-block transition metals
   $\delta$ from stoichiometry
6. (a) Co-La-Bi type:  Cobalt oxide      15–75 mole %
                       Lanthanum oxide   13–45 mole %
                       Bismuth oxide     17–50 mole %
   (b) Co-Sr-Ce type:  Cobalt oxide      14–40 mole %
                       Strontium oxide   40–55 mole %
                       Cerium oxide      15–40 mole %

TABLE I-continued

Mixed Conducting Solid Electrolytes

Material Composition

| | | |
|---|---|---|
| (c) Co-Sr-Bi type: | Cobalt oxide | 10–40 mole % |
| | Strontium oxide | 5–50 mole % |
| | Bismuth oxide | 35–70 mole % |
| (d) Co-La-Ce type: | Cobalt oxide | 10–40 mole % |
| | Lanthanum oxide | 10–40 mole % |
| | Cerium oxide | 30–70 mole % |
| (e) Co-La-Sr-Bi type: | Cobalt oxide | 15–70 mole % |
| | Lanthanum oxide | 1–40 mole % |
| | Strontium oxide | 1–40 mole % |
| | Bismuth oxide | 25–50 mole % |
| (f) Co-La-Sr-Ce type: | Cobalt oxide | 10–40 mole % |
| | Lanthanum oxide | 1–35 mole % |
| | Strontium oxide | 1–35 mole % |
| | Cerium oxide | 30–70 mole % |

7. $Bi_{2-x-y}M'_xM_yO_{3-\delta}$ ($0 \leq x \leq 1$, $0 \leq y \leq 1$, $\delta$ from stoichiometry)
   where: M' = Er, Y, Tm, Yb, Th, Lu, Nd, Sm, Dy, Sr, Hf, Th, Ta, Nb, Pb, Sn, In, Ca, Sr, La and mixtures thereof
   M = Mn Fe, Co, Ni, Cu and mixtures thereof
8. $BaCe_{1-x}Gd_xO_{3-x/2}$ where, x equals from zero to about 1.
9. One of the materials of $A_sA'_tB_uB'_vB''_wO_x$ family whose composition is disclosed in U.S. Patent 5,306,411 (Mazanec et al.) as follows:
   A represents a lanthanide or Y, or a mixture thereof;
   A' represents an alkaline earth metal or a mixture thereof;
   B represents Fe;
   B' represents Cr or Ti, or a mixture thereof;
   B" represents Mn, Co, V, Ni or Cu, or a mixture thereof;
   and s,t,u,v,w, and x are numbers such that:
   s/t equals from about 0.01 to about 100;
   u equals from about 0.01 to about 1;
   v equals from zero to about 1;
   w equals from zero to about 1;
   x equals a number that satisfies the valences of the A, A' , B, B' , B" in the formula; and $0.9 < (s + t)/(u + v + w) < 1.1$
10. One of the materials of $La_{1-x}Sr_xCu_{1-y}M_yO_{3-\delta}$ family, where:
    M represents Fe or Co;.
    x equals from zero to about 1;
    y equals a number that satisfies the valences of Ce and A in the formula
12. One of the materials of $Sr_{1-x}Bi_xFeO_{3-\delta}$ family, where:
    A represents a lanthanide, or Y, or a mixture thereof;
    x equals from zero to about 1;
    y equals a number that satisfies the valences of Ce and A in the formula
13. One of the materials of $Sr_xFe_yCo_zO_{3-\delta}$ family, where:
    x equals from zero to about 1;
    y equals from zero to about 1;
    δ equals a number that satisfies the valences of Sr, Bi and Fe in the formula
14. Dual phase mixed conductors (electronic/ionic):

$(Pd)_{0.5}/(YSZ)_{0.5}$
$(Pt)_{0.5}/(YSZ)_{0.5}$
$(LaCr_{1-y}Mg_yO_{3.0})_{0.5}/(YSZ)_{0.5}$
$(In_{90\%}Pt_{10\%})_{0.6}/(YSZ)_{0.4}$
$(In_{90\%}Pt_{10\%})_{0.5}/(YSZ)_{0.5}$
$(In_{95\%}Pr_{2.5\%}Zr_{2.5\%})_{0.5}/(YSZ)_{0.5}$
Any of the materials described in 1–13, to which a high temperature metallic phase (e.g, Pd, Pt, Ag, Au, Ti, Ta, W) is added Other membranes, that can be improved in the manner of the present invention, include Bi-based materials such as those reported in U.S. Pat. No. 5,160,713 of general composition $BiA_xM_yM'_zO_n$, U.S. Pat. No. 4,330,633 of general composition $Co(Sr,La)(Bi,Ce)O_x$ and U.S.Pat. No. 4,571,443 of formula $BiL_aM_bO_x$. All of the foregoing patents are incorporated by reference as if fully set forth herein.

As an example, two sections of LSCFM tube were prepared. One tube was treated in the manner outlined above for the coupon of FIG. 2 and the other tube was left untreated. Both tubes were about 7.98 cm. long and were cut from the same tube. The tubes were then exposed to an external flow of air an internal reactive purge containing about 40 percent by volume of methane, 57 percent by volume of nitrogen and about 3 percent by volume of water. The temperature of the tubes during the tests was about 1000° C. The treated tube showed an oxygen flux improvement by a factor of 2, that is an oxygen flux of about 1.9 sccm/cm$^2$ for the untreated tube and about 4.3 sccm/cm$^2$ for the treated tube. Additionally, burst test data showed that the strength of treated tube did not decrease and in fact increased. In this regard, the maximum pressure for the untreated tube was about 5.7 kpsi and about 8.1 kpsi for the treated tube. Such burst testing was conducted by subjecting tube sections to pressurized liquid corn oil at room temperature.

Although the present invention has been described with reference to a preferred embodiment, as will occur to those skilled in the art, numerous changes, additions and omission can be made without departing from the spirit and scope of the present invention.

What is claimed is:

1. An ion conducting ceramic membrane selectively permeable to a selected gas, said ceramic membrane comprising:
    a mass of a substance forming said ceramic membrane and through which gas ions migrate;
    said mass having two opposed surfaces where dissociation and ionization of said gas occurs and said gas ions release electrons and recombine to form molecules of said gas, respectively; and
    at least one of said two opposed surfaces treated to enhance permeation of said gas through the ceramic membrane by a removal of surface material to produce surface irregularities of increased area and therefore an increase in total surface area of a treated surface.

2. The ion conducting membrane of claim 1, wherein both of said two opposed surfaces are treated.

3. The ion conducting membrane of claim 1, wherein said selected gas is oxygen.

4. The ion conducting membrane of claim 1, wherein a thickness as measured between the two opposed surfaces is no greater than about 1.0 mm.

5. The ion conducting membrane of claim 1, wherein a thickness as measured between the two opposed surfaces is no greater than about 0.5 mm.

6. The ion conducting membrane of claim 1, wherein substance comprises a perovskite having the general formula:

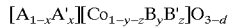

$$[A_{1-x}A'_x][Co_{1-y-z}B_yB'_z]O_{3-d}$$

wherein A is a group II metals, Ca, Sr, Ba, or a mixture thereof; A' is a rare earth metal and lanthanides or actinides, La, Y, Ce, Pr, Nd, Pm, Sm, Eu, Gd, Td, Dy, Ho, Er, Tm, or U or a mixture thereof; B is Mn, Cr, V, Ti, or a mixture thereof; B' is Cu or Ni or a mixture thereof; x is from 0.00001 to 0.9; y is from 0.001 to 0.9; z is from 0 to 0.8; and d is determined by the valence of the other metals and wherein the cubic perovskite phase is substantially stable over the temperature range of between about 25° C. and about 1000° C. in air.

7. The ion conducting membrane of claim 6, wherein both of said two opposed surfaces are treated.

8. The ion conducting membrane of claim 7, wherein a thickness as measured between the two opposed surfaces is no greater than about 1.0 mm.

9. The ion conducting membrane of claim 7, wherein a thickness as measured between the two opposed surfaces is no greater than about 0.5 mm.

10. A method of treating an ion conducting ceramic membrane selectively permeable to a selected gas to increase permeation of said gas, the ceramic membrane having two opposed surfaces where dissociation and ionization of said gas occurs and gas ions release electrons and recombine to form molecules of said gas, respectively, said method comprising removing surface material from at least one of two opposed surfaces of said ceramic membrane to produce surface irregularities of increased area and therefore an increase in total surface area of a treated surface.

11. The method of claim 10, wherein said surface material is removed by chemical etching, sand blasting, or ion bombardment.

12. The method of claim 10, wherein said surface material is removed by exposing said at least one of said two surfaces to an aqueous solution of $HNO_3$ having a concentration of between about 10 mole percent and about 50 mole percent for a time period of between about 15 minutes and about twenty four hours and then annealing said at least one of said two surface in air at a temperature in a range of between about 600° C. and about 900° C. for a time period of between about 10 minutes and about 30 minutes.

13. The method of claim 10, wherein both of said two surfaces are treated.

* * * * *